(12) United States Patent
Sevelle

(10) Patent No.: US 6,257,755 B1
(45) Date of Patent: Jul. 10, 2001

(54) COMPACT BUTTER MAKER

(76) Inventor: Taja Sevelle, 505 S. Beverly Dr., Beverly Hills, CA (US) 90212

(*) Notice: Subject to any disclaimer, the term of this patent is extended or adjusted under 35 U.S.C. 154(b) by 0 days.

(21) Appl. No.: 09/371,230

(22) Filed: Aug. 10, 1999

Related U.S. Application Data

(63) Continuation of application No. PCT/US98/26275, filed on Dec. 10, 1998, now abandoned.

(51) Int. Cl.⁷ ................................................ B01F 11/00
(52) U.S. Cl. ......................... 366/258; 366/256; 366/332
(58) Field of Search ................................ 366/332, 333, 366/334, 242, 243, 276, 278, 255, 256, 336, 258, 259, 257; 99/460, 465

(56) References Cited

U.S. PATENT DOCUMENTS

| | | | |
|---|---|---|---|
| 191,708 | * 6/1877 | Parrish | 366/332 |
| 224,493 | * 2/1880 | Turner | 366/332 |
| 291,901 | * 1/1884 | Hendeson | 366/258 |
| 302,617 | * 7/1884 | Womack | 366/258 |
| 344,232 | * 6/1886 | Askins | 366/259 |
| 374,991 | * 12/1887 | Nelson | 366/259 |
| 450,722 | * 4/1891 | Dickey | 366/332 |
| 898,207 | * 9/1908 | Fleming | 366/332 |
| 1,098,594 | * 6/1914 | Sieburg et al. | 366/256 |
| 1,175,366 | * 3/1916 | Lucas | 366/332 |
| 1,373,674 | * 4/1921 | Rodger | 366/332 |
| 1,489,956 | * 4/1924 | Mason | 366/258 |
| 1,846,664 | * 2/1932 | Wilsey | 366/332 |
| 1,890,307 | * 12/1932 | Shailer et al. | 366/256 |
| 2,513,577 | * 7/1950 | Malme | 366/256 |
| 5,813,760 | * 9/1998 | Strong | 366/332 |

FOREIGN PATENT DOCUMENTS

78267 * 12/1918 (CH) ................................ 366/258

* cited by examiner

Primary Examiner—Tony G. Soohoo
(74) Attorney, Agent, or Firm—Merchant & Gould P.C.

(57) ABSTRACT

The invention relates to a compact, powered butter maker including a drive housing, a cream container, a drive, and a dasher in complementary shape to that of the container.

11 Claims, 2 Drawing Sheets

COMPACT BUTTER MAKER

This is a continuation of application Ser. No. PCT/US98/26275, filed Dec. 10, 1998, now abandoned.

BACKGROUND OF THE INVENTION

Butter is a common food fat product that has been used throughout the world for centuries as an ingredient of other foods or as a condiment. Today, butter is commonly made on an industrial scale with apparatus suitable for handling tens, hundreds, or more gallons of cream or milk. In a day before commercial creameries, butter was commonly made in the home using mechanical churns that, typically, were manually operated. As commercial creameries became prevalent, home butter making became less popular and advances in equipment for home butter making slowed. As a result, modern improvements in kitchen appliances have not been incorporated into home butter makers. Therefore, there remains a need for a butter maker that can be conveniently used in a contemporary home kitchen.

SUMMARY OF THE INVENTION

The present invention relates to a butter maker that can be used in the contemporary home kitchen. The butter maker of the invention is compact and will fit on a counter or other surface in a home kitchen. The butter maker includes a cream container, a drive housing, a drive, and a dasher. The drive housing houses a drive, which is coupled to the dasher and adapted and configured to drive the dasher in reciprocal motion. The drive housing and the cream container are adapted and configured to reversibly mate and to position the dasher in the cream container for reciprocal motion within the container. The dasher and the container have complementary shapes with the dasher dimension to fit within the container and to define a space that can be occupied by cream within the container and around the dasher. Reciprocal motion of the dasher within the container converts the cream to butter.

DETAILED DESCRIPTION OF THE INVENTION

Figure 1:
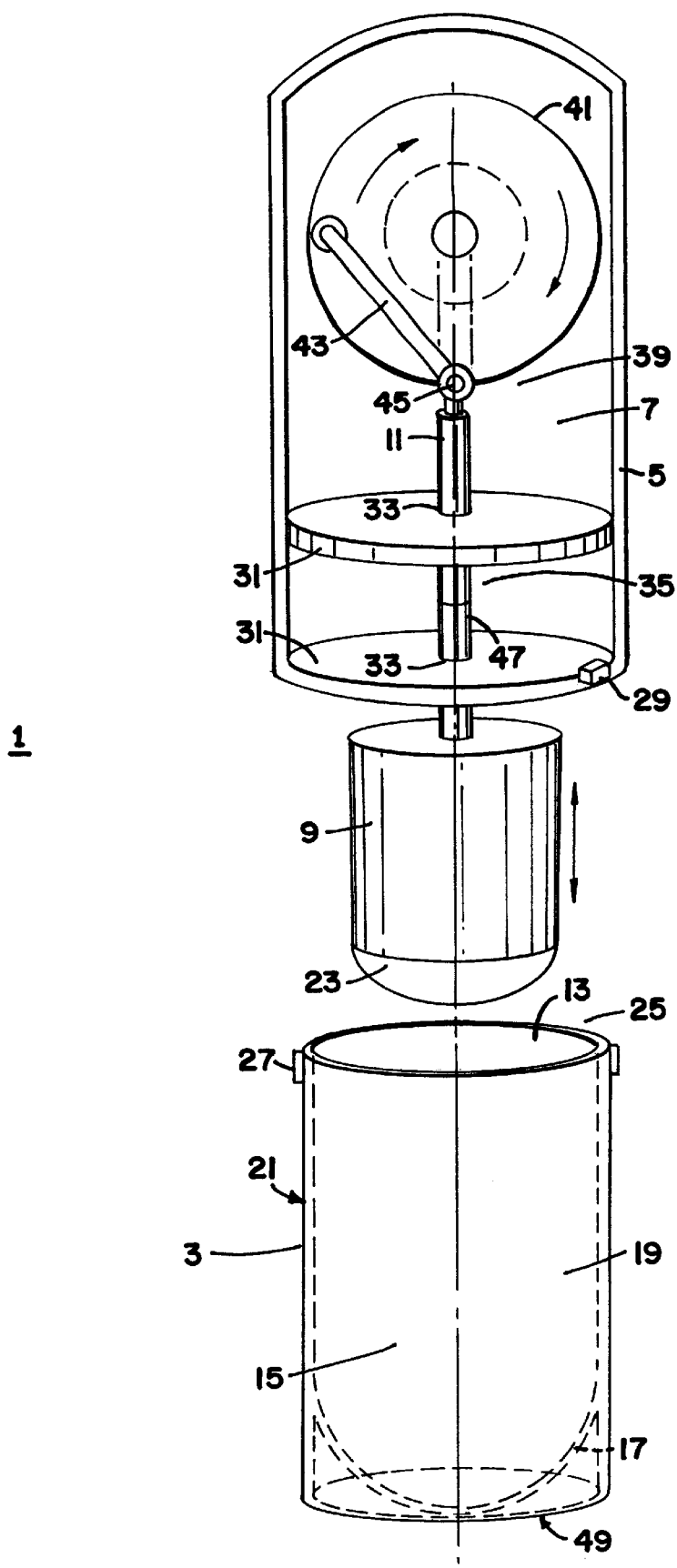
FIG. 1 shows a vertical cross-sectional view of the butter maker of the invention.
Figure 2:
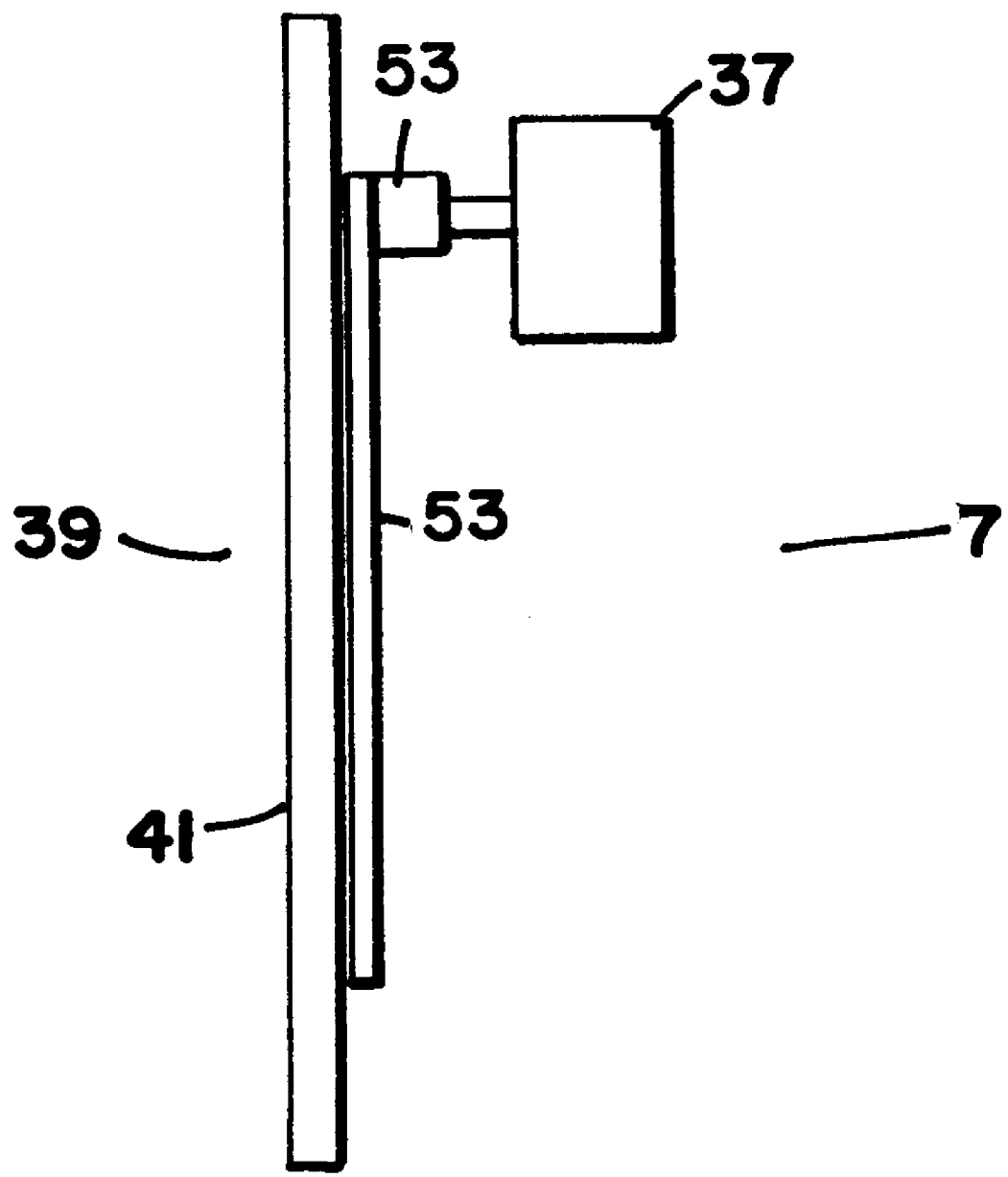
FIG. 2 shows an embodiment of gearing coupling motor to wheel.

As used herein, terms such as top, bottom, vertical, and horizontal are used to define features of the compact butter maker of the invention relative to one another. Such terms are not intended to limit the invention to any particular orientation other than with respect to the components of the butter maker. As used herein, the phrase "adapted and configured" is defined to be equivalent to the phrases "constructed and arranged" or "arranged and configured."

The present invention relates to a compact butter maker suitable for use in a modern kitchen. The compact butter maker is advantageously of a size that can be used conveniently on a countertop to provide an amount of butter used by a typical family over one or more days or a week or two, or for entertaining. The compact butter maker of the invention is a modern appliance with an appearance and operating characteristics compatible with the modern kitchen. The exterior of the compact butter maker can be of metal or plastic, with modern contours, with colors or finishes that are in harmony with the contemporary or traditional kitchen, and with a surface that can easily be cleaned with household cleaning agents. During operation, the compact butter maker may generate a low level of noise, for example, from the hum of the motor, the movement of the drive and dasher, and the churning of the liquid, but the noise is at an acceptable level for an appliance that runs for a prolonged time in a modern kitchen. The compact butter maker provides an advantageous countertop churn.

Compact butter maker 1 includes a cream container 3, a drive housing 5, a drive 7, and a dasher 9. Drive housing 5 houses drive 7, which is coupled to dasher 9 by rod system 11 that drives dasher 9 in linear or reciprocal motion. Drive housing 5 and cream container 3 are configured to position dasher 9 within cream container in an orientation where drive 7 can move dasher 9 in reciprocal motion within container 3. Drive housing 5 and cream container 3 can reversibly couple to one another to provide stability during the reciprocal churning of dasher 9 and the conversion of cream to butter in cream container 3. Advantageously, dasher 9 and container 3 have complementary shapes. Preferably, dasher 9 and cream container 3 are dimensioned with tolerances that provide narrow a channel between dasher 9 and an inner wall 13 of container 3 and create turbulent flow of the cream and/or butter during reciprocal motion of dasher 9. Such turbulent flow is advantageous for converting cream to butter. Typically, a period of about 5 minutes of reciprocal motion of dasher 9 in cream is sufficient to convert the cream to butter.

In a preferred embodiment, cream container 3 defines a generally cylindrical cavity 15 with a concave bottom 17. Cream container 3 is preferably taller than it is wide, and dasher 9 moves reciprocally along axis 19 of the cylinder. Although cream container 3 generally has axis 19 longer than its diameter, the mass and diameter of the cream container are sufficient to provide stability to compact butter maker 1 during its operation. Such stability can also be provided or augmented by a flared bottom to the cream container, which provides the base of the container with a larger diameter than the cavity, or with frictional or adhesive feet or pads that impede or prevent lateral movement of the butter maker on a surface.

Advantageously, cavity 15 defined by cream container 3 and dasher 9 have complementary shapes. For example, a square cylindrical cavity is complementary to a square cylindrical dasher and a cylindrical cavity 15 with a concave bottom 17 is complementary to a cylindrical dasher 9 with a convex end 23. The complementary shapes are selected to provide a space between container 3 and dasher 9 that provides for turbulent flow of the cream during reciprocal motion of dasher 9. Advantageously, when dasher 9 is moving reciprocally in generally cylindrical cavity 15, container 3 and dasher 9 define an annular ring-shaped space between dasher 9 and container 3. At its closest approach to bottom 17 of container 3, dasher 9 does not contact the bottom of the container. Typically, dasher 9 moves to within about 0.030 inches of the bottom of the container.

Container 3 is open at top end 25 to receive cream and dasher 9, and for removing butter. Top end 25 of container 3 also includes apparatus 27 for reversibly connecting or mating to drive housing 5. For example, drive housing 5 can threadably engage top 25 of container 3; drive housing 5 can define a cavity of larger diameter than container 3, and in which container 3 nests; drive housing 5 can have a tab which rotatably engages a locking receptacle on container 3; container 3 can have a locking tab 27 that rotatably engages a locking receptacle 29 on drive housing 5; clamps on either drive housing 5 or container 3 can engage a member on the other; or the like. Advantageously, drive housing 5 reversibly mates with or engages the cream container by twisting and locking in place, preferably, with only about ⅛ of a revolution of twist. Drive housing 5 and the cream container 3 are coupled during operation to retain drive housing 5 on container 3 and to prevent release of cream and/or butter during reciprocal motion of dasher 9.

Drive housing 5 houses drive 7 and can include any fixtures, couplers, attachments, conduits, or ports needed for operation of drive 7. In one embodiment, drive housing 5 includes one or more plates 31 positioned along a horizontal cross-section of housing 5 and defining an aperture for passage of a shaft 35 connected to dasher 9. In generally cylindrical drive housing 5, plate 31 is generally radially oriented and includes generally centered aperture 33 through which shaft 35 passes. Aperture 33 can be, for example, circular or a slot. Advantageously, aperture 33 is configured to retain shaft 35 in a generally vertical orientation. Drive housing 5 houses and retains drive 7 in a manner that allows drive 7 to transmit circular motion from a motor 37 to linear or reciprocal motion of shaft 35 and dasher 9.

Drive 7 includes motor 37 and a conversion system 39 to convert rotational motion of motor 37 to linear or reciprocal motion of shaft 35 and dasher 9. In one embodiment, drive 7 includes motor 37 rotatably coupled to a wheel 41, which is in turn pivotably coupled to a connecting rod or pitman 43, which is pivotably connected to shaft 35. Motor 37 can be rotatably coupled to wheel 41 through any conversion system 39 suitable for converting rotational motion of motor 37 to rotational motion of wheel 41. Advantageously, the coupling reduces the number of revolutions of wheel 41 compared to motor 37. Such coupling can be accomplished using one or more gears 53, one or more belts, frictional contact between a small wheel and a larger wheel, or the like. Motor 37 is preferably a small electric motor operable on household current, such as 120 volts 60 cycles or 210 volts 50 cycles. Wheel 41 is pivotably connected to connecting rod or pitman 43 using any suitable apparatus such as a pin 45, a retaining pin, a bearing, or the like. Preferably, wheel 41 and connecting rod 43 are coupled by pin 45, which can be attached to either the rod or the wheel. Preferably, the pivotal connection of wheel 41 and connecting rod 43 does not require external lubrication, and preferably, is self-lubricating. Connecting rod 43 is similarly coupled to shaft 35. Shaft 35 can extend through optional plates 31 in drive housing 5 and is rigidly coupled to dasher 9 so that dasher 9 does not move laterally or vertically relative to rod 35.

Dasher 9 provides agitation, mixing, and/or turbulence of cream and/or butter in cream container 3. Dasher 9 is configured to occupy a significant portion of cavity 15 that contains cream. In this fashion, cream is displaced at least horizontally as dasher 9 undergoes reciprocal vertical motion. Advantageously, dasher 9 also has sufficient height to provide a significant vertical channel between dasher 9 and wall 13 of container 3. Such a channel provides additional agitation of the cream during reciprocal motion of dasher 9. In a preferred embodiment, container 3 defines a cylindrical cavity 15 with concave bottom 17, and dasher 9 has a generally cylindrical shape with a convex end 23. The dimensions of the dasher and the container are chosen to provide a space for cream between the dasher and the cavity that is advantageous for agitation of the cream to produce butter. The dasher can have a plurality of channels in its surface.

Compact butter maker 1 of the invention can be assembled to provide for convenient use in a home kitchen. For example, dasher 9 and, optionally, a portion 47 of the shaft can be detached from drive housing 5 for cleaning, and another portion 11 of shaft 35 remains coupled to drive 7. In addition, the materials used for construction of the portions of the butter maker which contact the cream and/or butter can be plastic, stainless steel, teflon, or another substance from which butter or dairy products can be removed readily. Advantageously, the exterior of compact butter maker 1 is made from similar materials for easy cleaning and tidy appearance in a home kitchen.

The compact butter maker of the invention can be used for making butter by placing cream container 3 on its base 49 on a table or countertop, and adding milk or cream to cavity 15. Salt or coloring can be added to the cream before it is churned into butter. Then drive housing 5 is coupled to cream container 3 with dasher 9 oriented for reciprocal motion in cavity 15 defined by container 3. Power, such as electrical power, is provided to drive 7, such as by closing a switch, to provide reciprocal motion of dasher 9. Reciprocal motion of dasher 9 agitates the cream and/or milk in container 3, and over a period of about 5 minutes, converts the cream and/or milk to butter. When the butter is made, drive housing 5 can be removed from the cream container to provide access to cavity 15 containing butter, and possibly buttermilk. Buttermilk, if any, can be removed from the butter, and the butter can be removed with a spoon, a spatula, or another suitable utensil. Salt can be added to the butter after churning. The butter can then be formed into the desired shape and refrigerated, or used directly.

One of skill in the art can envision that the foregoing description employs the terms vertical, horizontal, top, and bottom in a relative sense. One of skill in the art knows that the butter maker of the invention could be constructed with the axis of the reciprocating motion of the dasher in an orientation that is not strictly vertical to the plane of the earth. For example, the reciprocal motion could be at an acute or oblique angle, or even horizontal if provision were made for retaining cream or butter within the container and for adding cream, preferably in a manner that the cream can be poured into the container and does not leak out during addition.

The invention has been described with reference to various specific and preferred embodiments and techniques. However, it should be understood that many variations and modifications may be made while remaining within the spirit and scope of the invention.

I claim:

1. A compact butter maker adapted and configured for countertop operation comprising:

a cream container, a drive housing, a drive, and a generally cylindrical dasher;

the drive comprising a motor, a wheel, a connecting rod, and a shaft, wherein the motor is rotatably coupled to the wheel, the wheel is pivotably coupled to the connecting rod, the connecting rod is pivotably connected to the shaft, and whereby rotational motion of the motor is transformed to reciprocal motion of the shaft;

the drive housing housing the drive, the drive being coupled to the dasher and adapted and configured to drive the dasher in reciprocal motion, the drive housing further comprising at least one plate, each plate being generally oriented along a horizontal cross section within the housing, the plate defining an aperture for the shaft, the aperture retaining the shaft in a generally vertical orientation;

the drive housing and the cream container being adapted and configured to reversibly mate and to position the dasher in the cream container for reciprocal motion therein;

the dasher having an outer surface and the container having an inner surface whereby the dasher outer surface and the container inner surface have complementary shapes, the dasher being dimensioned to fit within the container with tolerances that provide space between the dasher and the container for circulation of cream or butter during reciprocal motion of the dasher;

the shaft comprising a first portion and a second portion, the first portion being coupled to the connecting rod, the second portion being removable from the first portion, whereby the second portion can be removed from the butter maker for cleaning;

whereby the circulation of cream during the reciprocal motion converts the cream to butter.

2. The compact butter maker of claim 1, wherein the cream container defines a generally cylindrical cavity with a concave bottom.

3. The compact butter maker of claim 1, wherein both the drive housing and the cream container are adapted and configured to reversibly mate with each other by twisting and locking in place with about ⅛ of a revolution of twist.

4. The compact butter maker of claim 1, wherein the drive housing is generally cylindrical and the aperture is generally circular.

5. The compact butter maker of claim 1, wherein the aperture is a slot.

6. The compact butter maker of claim 1, further comprising one or more gears adapted and configured to rotably couple the motor to the wheel.

7. The compact butter maker of claim 1, further comprising a self lubricating pin pivotably coupling the wheel to the connecting rod.

8. The compact butter maker of claim 1, further comprising a self lubricating pin pivotably coupling the connecting rod to the shaft.

9. The compact butter maker of claim 1, wherein the dasher is generally cylindrical with a convex end distal to the rod.

10. The compact butter maker of claim 1, wherein the dasher is removably coupled to the shaft;

whereby the dasher can be removed from the butter maker for cleaning.

11. The compact butter maker of claim 1, wherein the dasher has a plurality of channels in its surface.

\* \* \* \* \*